United States Patent [19]
Lazarevic

[11] Patent Number: 6,065,212
[45] Date of Patent: May 23, 2000

[54] POWERED TUBE CUTTER AND CUTTING PROCESS

[76] Inventor: Milisav Lazarevic, 1222 Shorecrest Dr., Racine, Wis. 53402

[21] Appl. No.: 09/207,381

[22] Filed: Dec. 8, 1998

[51] Int. Cl.[7] .............................. B23D 21/00; B26D 3/16
[52] U.S. Cl. .................................. 30/101; 30/97
[58] Field of Search .................... 30/92, 93, 94, 30/95, 96, 97, 101, 102; 82/70.1, 70.2, 72, 73, 113

[56] References Cited

U.S. PATENT DOCUMENTS

| | | |
|---|---|---|
| 3,807,047 | 4/1974 | Sherer et al. ................................. 30/97 |
| 3,839,791 | 10/1974 | Feamster, III ................................ 30/97 |
| 4,438,562 | 3/1984 | Courty . |
| 4,762,038 | 8/1988 | Olson ......................................... 30/97 |
| 4,769,911 | 9/1988 | Araki . |
| 4,802,278 | 2/1989 | Vanderpol . |
| 4,939,964 | 7/1990 | Ricci ......................................... 30/97 |
| 4,953,292 | 9/1990 | Tobey .......................................... 30/97 |
| 5,088,196 | 2/1992 | Fukuda . |
| 5,243,760 | 9/1993 | May, Jr. ..................................... 30/101 |
| 5,495,672 | 3/1996 | Kritechever . |
| 5,836,079 | 11/1998 | Cronin et al. .............................. 30/101 |

FOREIGN PATENT DOCUMENTS 987485  4/1976  Canada ...................................... 30/97

*Primary Examiner*—Hwei-Slu Payer
*Attorney, Agent, or Firm*—Arthur J. Hansmann

[57] ABSTRACT

A tube cutter and process for cutting tubes, including a housing with a gear cluster therein and with the cluster providing for two separate drive controls to the cutter and the supporting rollers, both of which engage the tube to be cut. The drive controls are arranged to be relative one to the other so that the feed of the cutter against the tube to be cut can be regulated. Regulation may be achieved by different motor speeds or by a brake mechanism. The cutter automatically adjusts radially to the tube and revolves there-around in the cutting process.

23 Claims, 10 Drawing Sheets

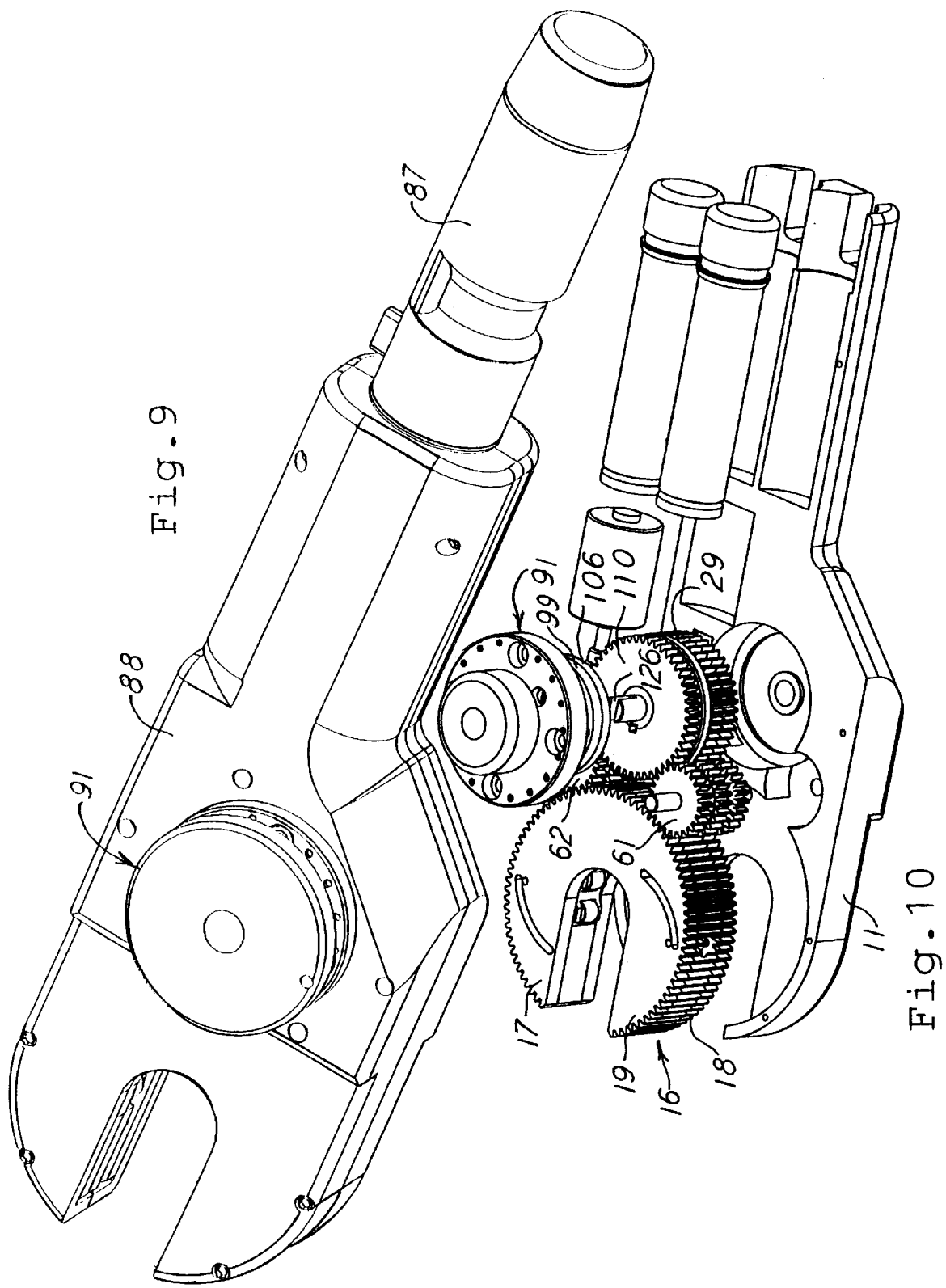

Fig.15
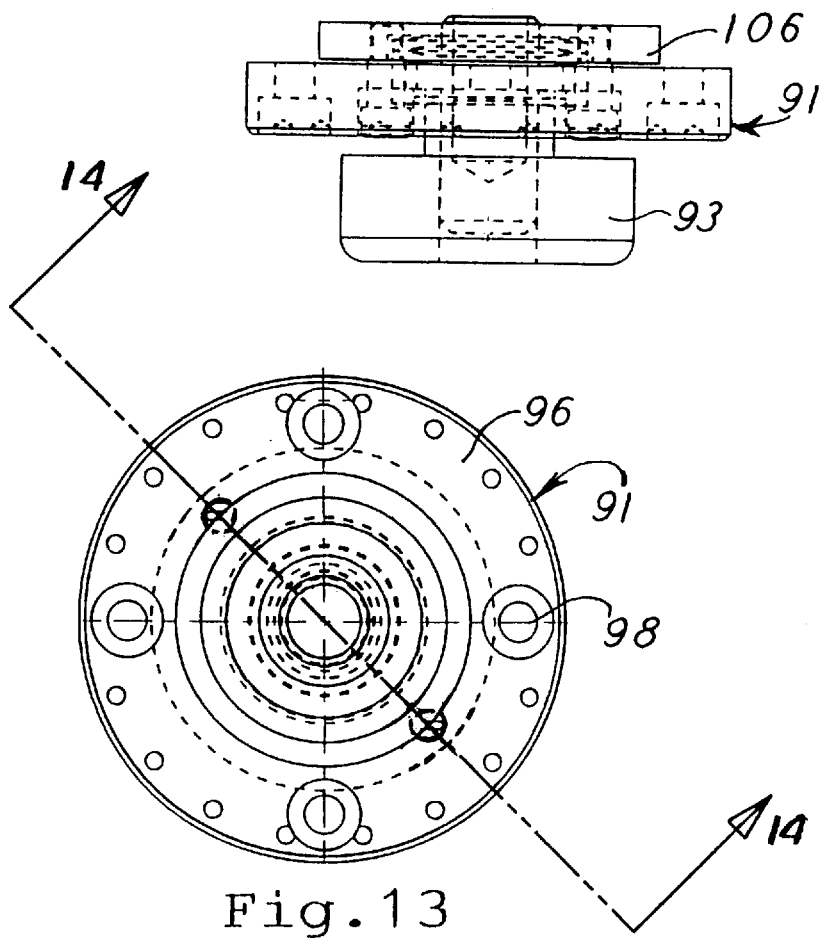
Fig.13
Fig.14
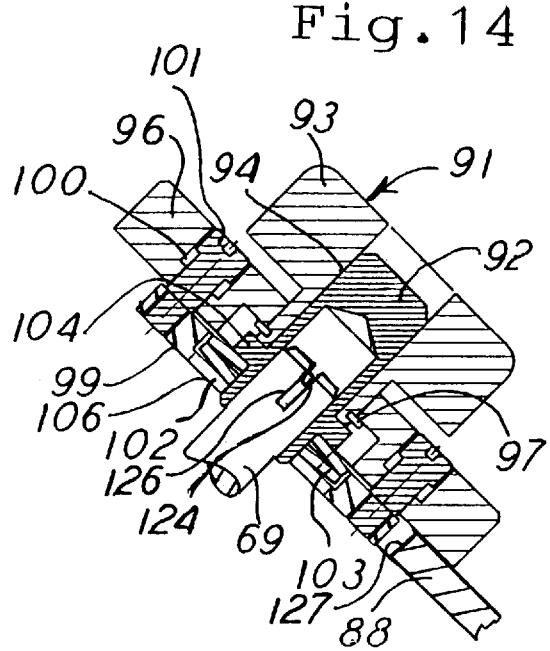

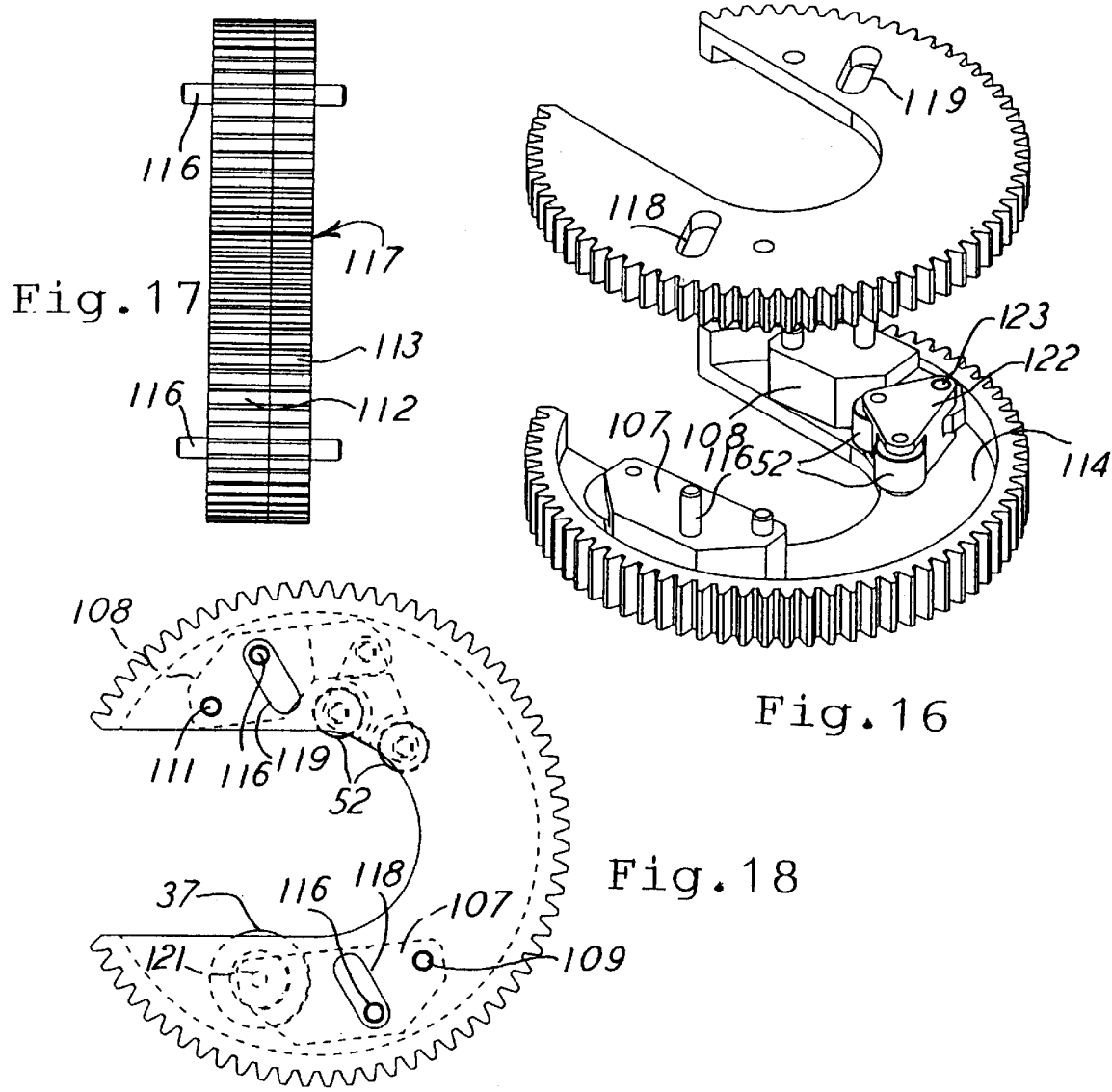

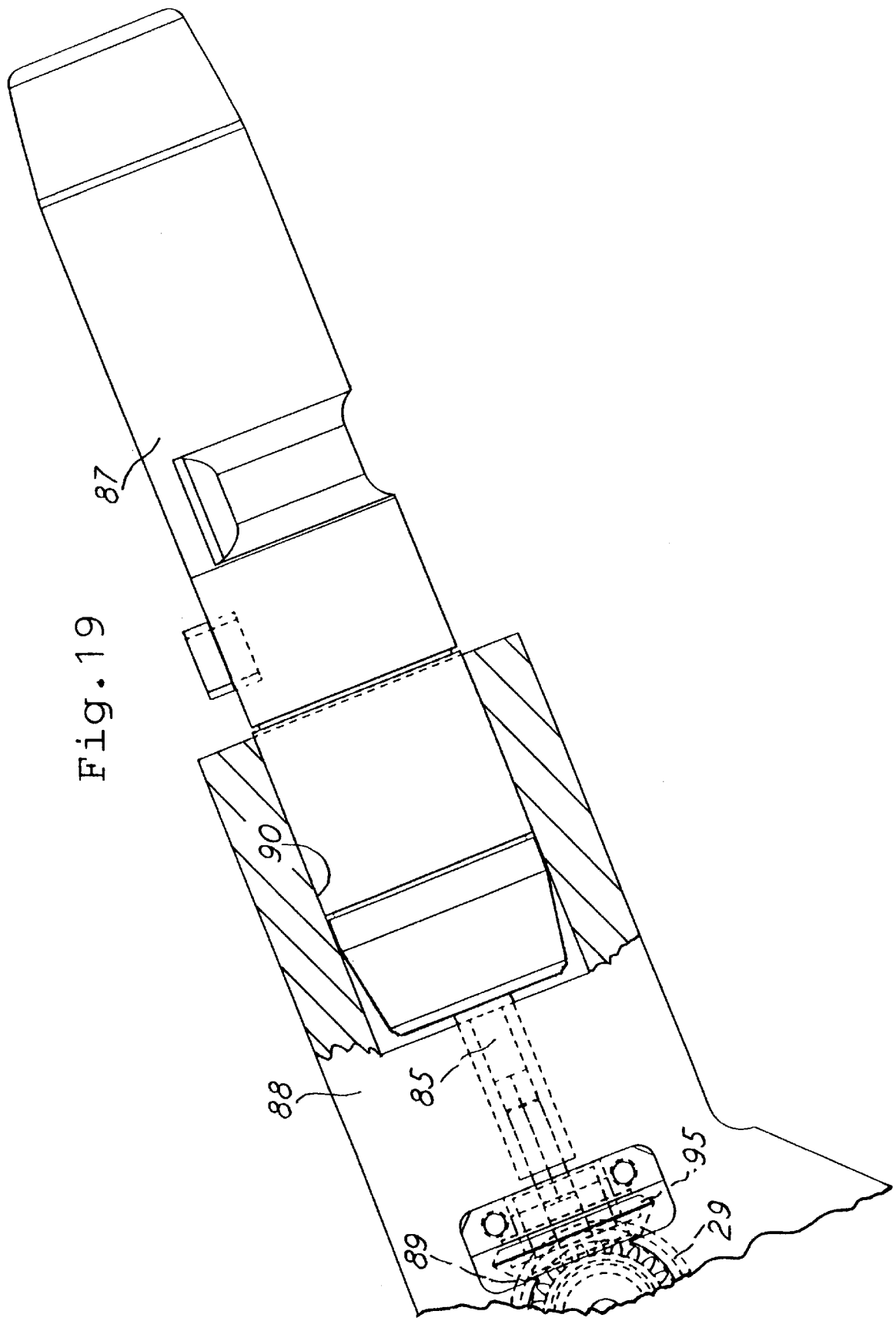

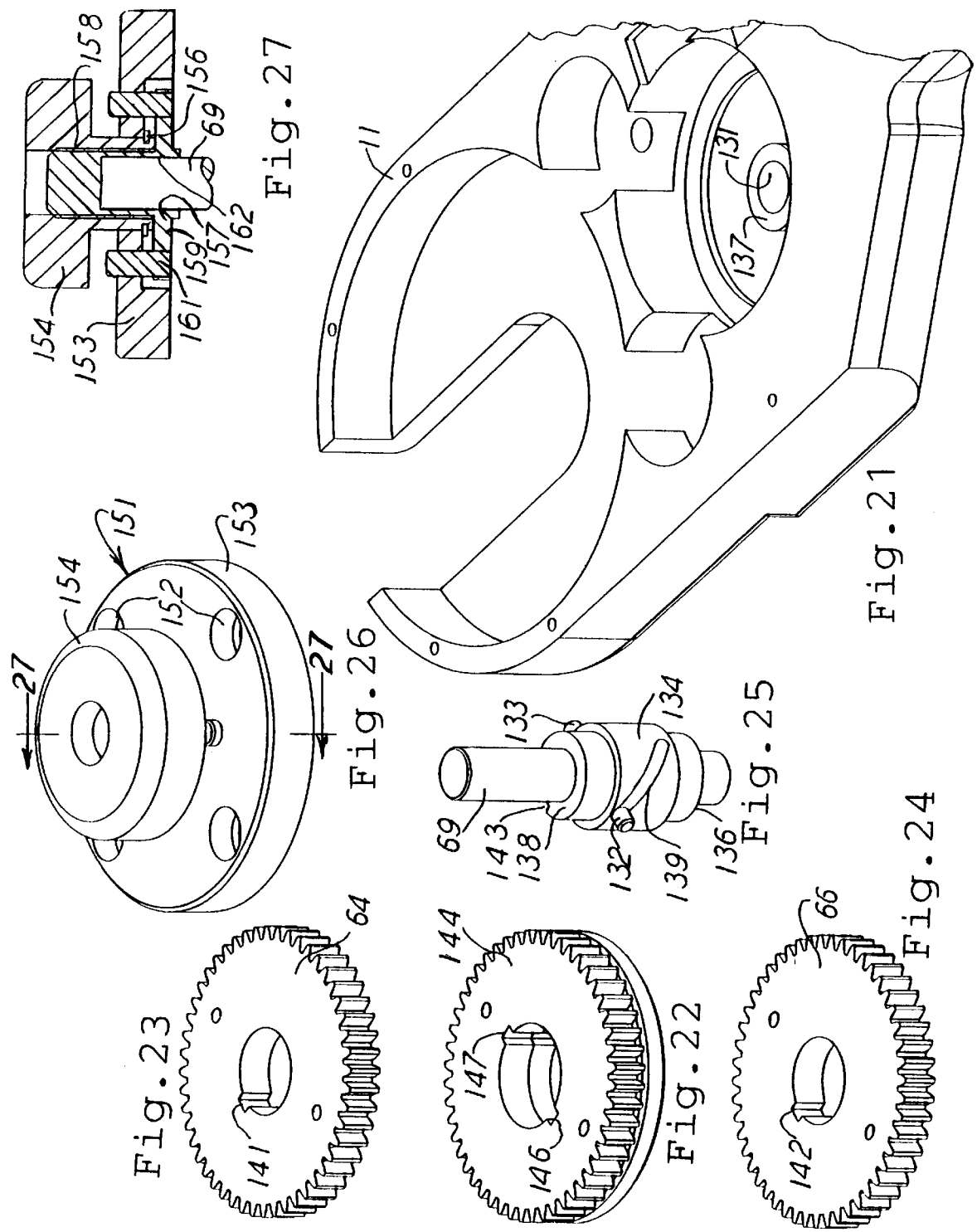

POWERED TUBE CUTTER AND CUTTING PROCESS

This invention relates to a powered tube cutter and cutting process, and, more particularly, it relates to a tube cutter which is powered, portable, and hand manipulated.

BACKGROUND OF THE INVENTION

Hand held and powered tube cutters are known in the prior art and they are useful in cutting tubes or pipes on the work site and in restricted spaces. For instance, U.S. Pat. No. 4,802,278 discloses a powered tube cutter, but it is not one which is self-adjusting for different diameters of tubes, and its cutting blade does not continuously feed in but instead it notches in. U.S. Pat. No. 4,769,911 requires manual adjustment for the diametrical size of the tube and it has only a fixed cutting feed rate. Also, as in U.S. Pat. No. 5,495,672, the cutter cuts through a pipe of only one size in a setting of a pre-loaded cutting wheel and support rollers which appear to cause initial unacceptable dents in the tube. Still further, the prior art, such as U.S. Pat. No. 5,088,196 has inefficient constant feed systems with undue shock loads from loss of contact between the feed roll and the rolling surface in the tube location area.

An object of the present invention is to provide a powered tube cutter which automatically adjusts for different diametrical sizes of tubes within a range designed for the particular tool of this invention. Further, it is capable of adjustments for selecting the amount of cutting penetrations for each revolution of the cutter around the tube and thus it is suitable for chipless cutting of different materials, such as plastic and copper, and for harder materials, such as steel and titanium.

Other objects and features of the tool of this invention include that of a self-centering cutting mechanism which automatically adjusts to tube diameter within a selected range and which has an access head for easy application onto and removal from the tube. Further, the tool has a cutting blade and rollers which automatically move in unison toward and away from the tube, and the movement is continuous throughout each revolution around the tube and is not in notching stages.

Still further, the tool has an adjustable feed rate which is useful for different material hardnesses. Also, the tool cutter itself can be driven through self-contained battery power or from another power tool which readily drivingly connects to the tool of this invention. There is an automatic feed of the cutting blade into the tube, and that is achieved through a feed drive where the rate can be controlled. Thus, there is a drive arrangement for moving the cutter blade around the tube and there is also a feed arrangement for moving the cutter blade radially inwardly on the tube in the cutting process. The operative positions for the cutting action are automatically achieved and are under the control of a single button control, for instance.

Prior to each cutting action, the tool is automatically placed in a tube-receiving mode and is thus ready to cut.

BRIEF DESCRIPTION OF THE DRAWINGS

FIG. 9 is a perspective view of a second shown embodiment of this invention.

FIG. 10 is a perspective view of another arrangement of this invention and basically a combining of FIGS. 1 and 9.

FIG. 13 is an enlarged top plan view of a part of FIG. 9.

FIG. 14 is a sectional view on the plane 14—14 of FIG. 13.

FIG. 15 is a side elevational view of FIG. 13.

FIG. 16 is an enlarged and exploded view of a portion of a third shown embodiment of this invention.

FIG. 17 is a side elevational view of FIG. 16 assembled.

FIG. 18 is a left side view of FIG. 17.

FIG. 19 is a side elevational view of a fourth shown embodiment of this invention.

FIG. 21 is a perspective view of the lower housing.

FIG. 22 is a perspective view of a gear used in a fifth shown embodiment of this invention.

FIGS. 23 and 24 are perspective views of the gears shown in FIGS. 1 and 2.

FIG. 25 is a perspective view of another arrangement of the part shown in FIG. 7, for use in the fifth shown embodiment.

FIG. 26 is a perspective view of a part used with FIG. 25.

FIG. 27 is sectional view on the plane designated by the line 27—27 on FIG. 26.

DETAILED DESCRIPTION OF THE PREFERRED EMBODIMENTS AND PROCESS

This invention pertains to both a tube cutting tool and a process for cutting tubes. The drawings and this word description will particularly be directed at the parts and construction of the tube cutter itself, and the process will also be disclosed along with the description of the tool.

Generally, the cutter of this invention is arranged so that a tube-cutting blade and supporting rollers which engage the tube are automatically positioned to be concentric relative to the longitudinal axis of tube. Further, the tool is arranged such that a drive opposite that of the drive for cutting will automatically open the tool for receiving the tube and be automatically centered thereon when the cutting is commenced.

Still further, the arrangement is such that the cutting blade revolves centrally around the tube to be cut, and the depth of cut for each revolution is controlled so that tubes of hard material can be cut with one amount of cutting penetration, and tubes of softer material can be cut with another amount of penetration, all as desired.

Figure 1:
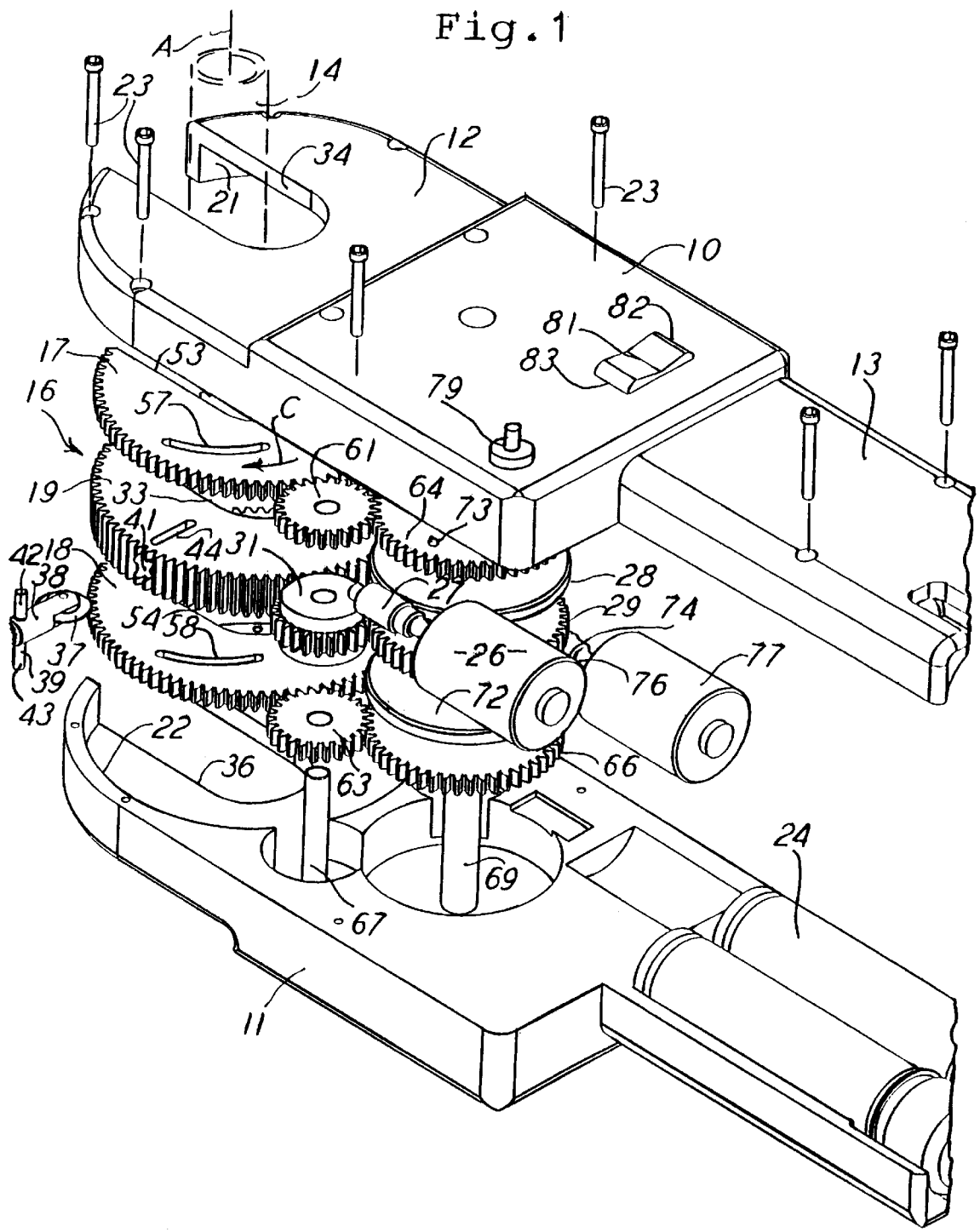
FIG. 1 is an exploded perspective view of a first shown embodiment of this invention.

FIG. 1 shows the tool to include two housing halves 10 and 11 and they present a body portion 12 at one end thereof and a handle portion 13 at the opposite end thereof. Of course the operator would grip the handle 13 and would direct the tool head portion 12 onto a tube 14 shown in dotted lines and which is to be severed along its upright length. Again, in the arrangement and use of this tool, it is automatically centered relative to the upright axis "A" of the tube 14 which is secured in a fixed position, such as in a structural installation, but it requires that the end of the tube be cut off.

Figure 2:
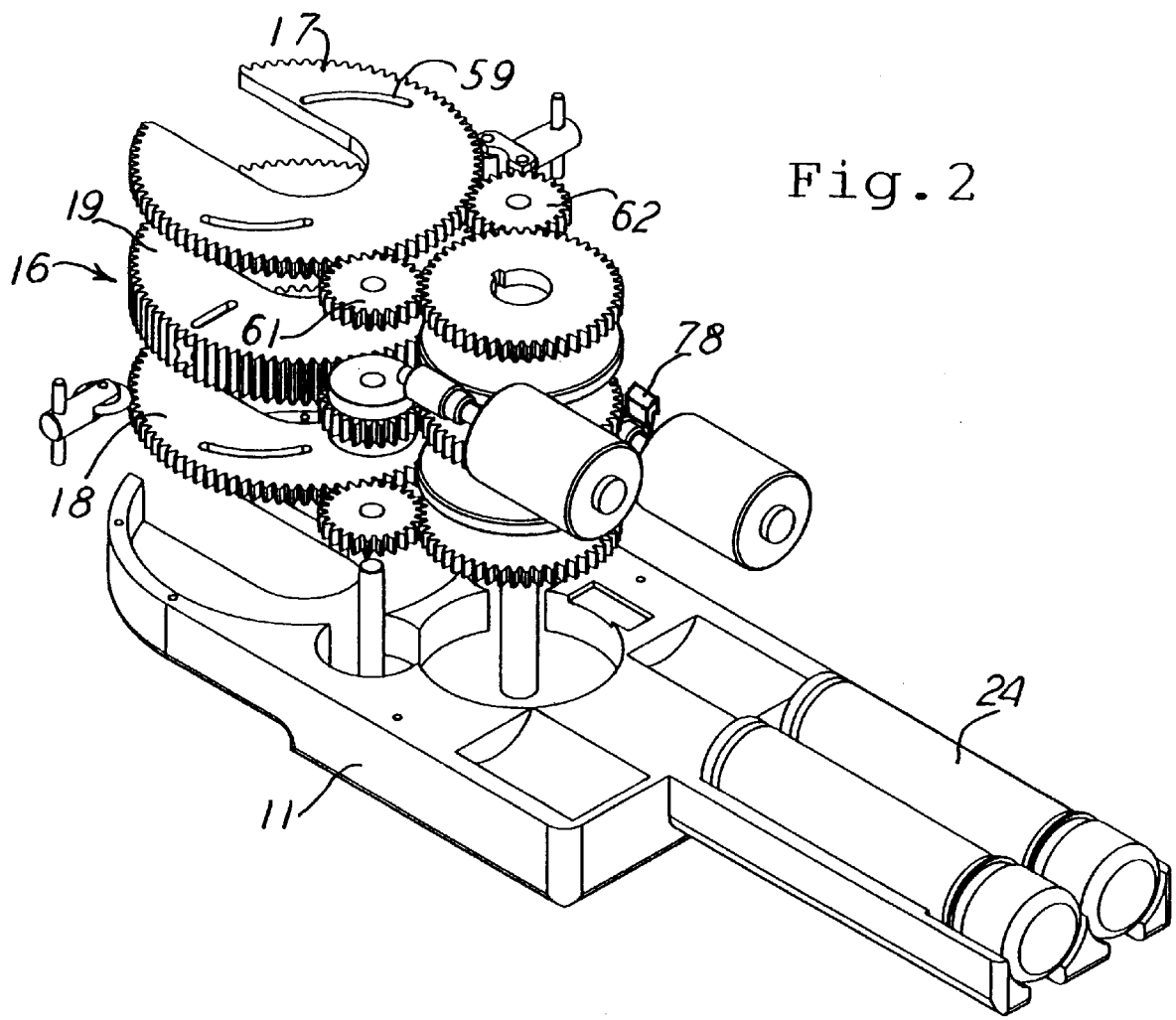
FIG. 2 is a view similar to FIG. 1, with a part omitted.

FIGS. 1 and 2 show a gear set generally designated 16 disposed within the housing. Upper gear 17 and lower gear 18 are feed gears which cause the cutting blade to advance into the wall of the tube 14. The center gear 19 is a drive gear which causes the assembly to revolve around the tube 14 and coaxial with the axis "A". Those gears 17, 18 and 19 are rotatably supported in the housing cavities 21 and 22. Of course the housing halves 10 and 11 are then secured in abutment with each other and held by means of the shown screws, such as the screws 23.

Figure 11:
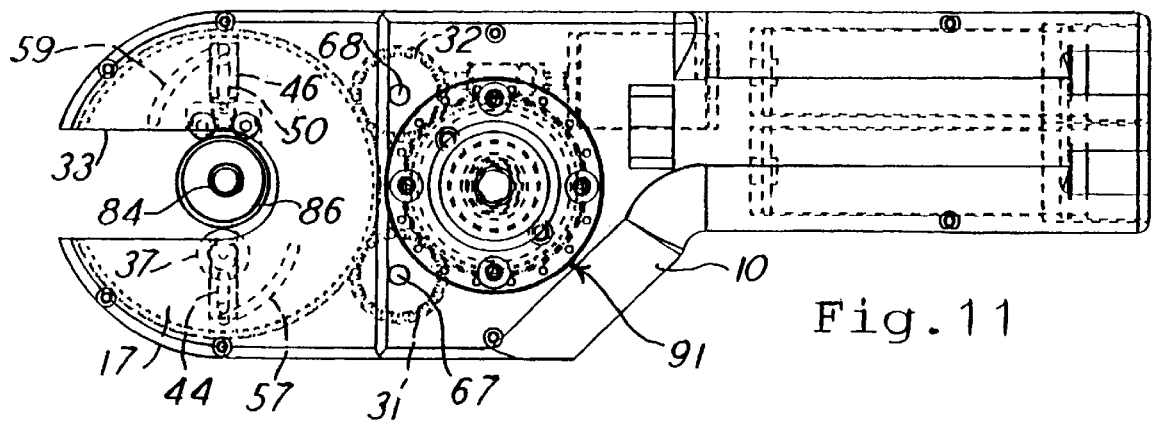
FIG. 11 is a top plan view of the FIG. 10 arrangement.
Figure 12:
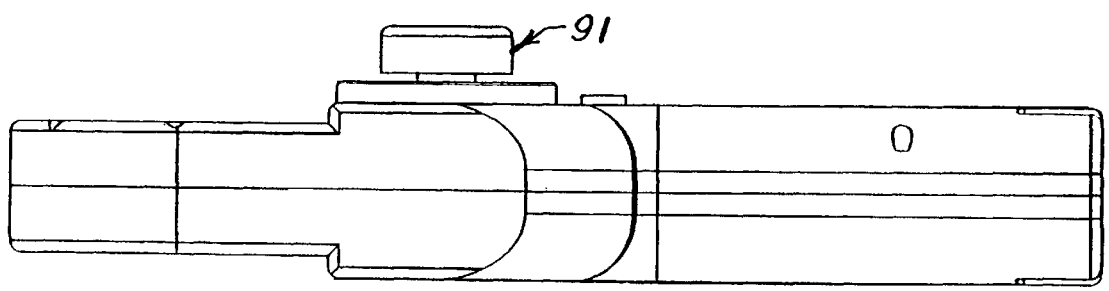
FIG. 12 is a side elevational view of FIG. 11.

The embodiments of the tool shown herein are shown to be electrically powered, though there could be other means for powering them, but, as shown, there is a battery pack 24 which is suitably electrically connected with a drive motor 26. For a preliminary description of the gears and drive, mention is now made of a worm gear 27 which is in worm gear drive relation with the worm wheel indicated at 28. For purposes of clarity and simplicity of the drawings, the gear teeth on the worms 27 and 28 are not shown, and that is also true in the later description herein, but it will be understood that they are in worm gear drive relationship in the conventional arrangement. A spur gear 29 is rotatably mounted beneath the worm wheel 28 and it rotates relative to the worm wheel 28, and the gear 29 is in driving relation with two idler gears 31 and 32 and both are shown in FIGS. 10 and 11.

Figure 4:
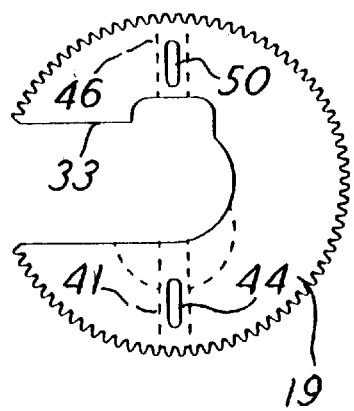
Figure 5:
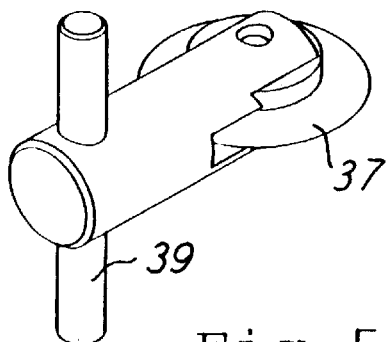
FIGS. 5 and 6 are perspective views of the cutter and rollers used in this invention.
Figure 6:
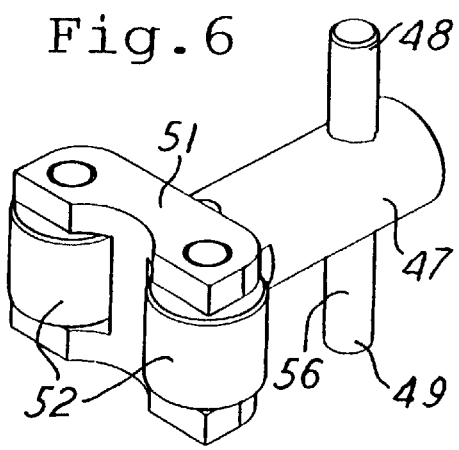

As described later, there is a first gear drive through a a shown motor drive motor and its shown worm connection and to the gears 29 and 31 and 32 which are in driving relation with the main drive gear 19. Such as seen in FIGS. 1 and 4, the drive gear 19 has a radial slot 33 which serves as a receptor for the tube 14, as well as do the radial slots 34 and 36 in the respective upper 10 and lower 11 housing halves.

With the gears 31 and 32 being on the same plane and in mesh with the teeth of the gear 19 but being spaced apart along the circumference of the gear 19, there will always be at least one of the gears 31 and 32 in driving relation with the gear 19, even when the gear slot 33 is rotated to a position adjacent the idlers 31 and 32. That is true because the idlers 31 and 32 span the slot 33, and that is a conventional arrangement for a tube cutter.

The gear 19 carries a circular and rotatably mounted cutter blade 37 which is on a slotted support 38 which in turn carries a pin 39 projecting to both sides of the support 38. The support 38 fits into a radial opening 41 in the gear 19 and the pin 39 has ends 42 and 43, and the pin 39 can pass through a through slot 44 in the gear 19 to extend through the support 38. The pin ends 42 and 43 extend above and below, respectively, the upper face and the lower face of the gear 19, for a purpose described later. In that assembly, the circumference of the blade 37 projects into the gear slot 33, such as seen in FIG. 11.

Diametrically opposite the cutter 37 and the radial opening 41, the gear 19 has another radially disposed opening 46, such as seen in FIG. 11, and that opening receives a support 47 which extends radially into the gear 19 and has its vertical pin 50 with upper ends 48 and 49 extending into a radial slot 50 in the gear 19, just as with the cutter pin ends 42 and 43. The support 47 carries a roller bracket 51 rotatably supporting two rollers 52 which face inwardly to the gear slot 33, as also seen in FIG. 11.

With the arrangement mentioned to this point, the cutter blade 37 and the two rollers 52 are positioned in contact with the circumference of the tube 14 when cutting is undertaken. Again the arrangement is such that the circumference of the cutter blade 37 and the circumference of the rollers 52, both circumferences of which are in rolling contact with the tube 14, are automatically centered relative to the axis "A". In that arrangement, the roller pin ends 48 and 49 project through the radial slot 50 in the gear 19, and, just as with the cutter pin 39, the rollers move radially relative to the slot 50 and thereby toward and away from the axis "A", as with the movement of the cutter 39 relative to the its radial slot 44.

The feed gears 17 and 18 have radial cut-outs 53 and 54 therein to align with the radial cut-outs 33, 34, and 36 so that all the cut-outs are aligned for receiving the tube 14. Also, the projecting ends of the cutter pin 39 extend into arcuate cam slots 57 and 58 in gears 17 and 18, respectively, and, likewise, the projecting ends of the roller pin designated 56 extend into arcuate cam slots 59 in the gear 17 and an unshown but similarly disposed and shaped arcuate slot 59 in the lower feed gear 18. The arrangement is such that upon relative rotation between the drive gear 19 and the feed gears 17 and 18, the cutter 37 and the rollers 52 will desirably move radially relative to the axis "A".

Two idler gears 61 and 62 are in mesh with the feed gear 17 and are spaced apart to span the cut-out 53. Likewise, two idler gears 63, only one of which is shown, are in mesh with the lower feed gear 18 and are the same as and axially aligned with the gears 61 and 62 and are likewise spaced apart to span the opening 54, as mentioned. There is an upper feed gear 64 in mesh with the two idler gears 61 and 62 and there is a lower feed gear 66 in mesh with the two idler gears 63 in the same manner as with the idler gears 61 and 62.

All of the aforementioned six idler gears are mounted on two spaced-apart posts 67 and 68 so that the idler gears are rotatable. A fixed post 69 is supported in the housing, such as similar to the post 67, and it rotatably supports a sleeve 71 shown in FIG. 7, and the support post 69 extends therethrough so that the sleeve 71 is rotatable thereon. Feed gears 64 and 66 are keyed to the sleeve 71 to rotate together and thereby induce the same rotation through the feed gears 17 and 18. Drive gear 29 along with an attached worm wheel 72 are rotatable relative to the sleeve 71 as described hereinafter. The worm wheel 28 is drivingly connected to the gear 64 by means of an interconnecting pin 73, and likewise the worm 72 and gear 29 are interconnected by means of axially extending pins between the two.

In operation, when the motor 26 is powered by the batteries or any external power supply, the worm 27 rotates the worm wheel 28 and likewise rotates the feed gear 64 and the meshing idlers 61 and 62 and thus rotates the feed gear 17 in the clockwise direction from above and as indicated "C" in FIG. 1. Because of the rotation and the connection between the feed gears 64 and 66, the feed gear 18 rotates identical to the rotation of the feed gear 17. Relative rotation between the drive gear 19 and the feed gears 17 and 18 causes the pins 39 and 56 to respectively move radially in the cam slots 57 and 58, and in the radially slots 44 and 50, and thereby respectively urge the cutter 37 and the rollers 52 toward the tube 14 and in contact therewith. That action, and through the drag of the pins 39 and 56 will subsequently force rotational drive on the drive gear 19 in that clockwise direction and thus the spur gears 31 and 32 and the drive gear 29 will rotate. That rotation will be imposed upon the worm gear 74 which is mounted on the shaft 76 to move axially thereon in a conventional manner and thereby trip a conventional electric switch to thus start the electric motor 77. As mentioned, that type of electric switch on a worm gear is conventional and that is switch 78. A manually controllable adjustment 79 is suitably electrically connected with the motor 77 to permit setting the selected speed for the motor 77. That speed for the motor 77 will be less than the speed for the motor 26 and that allows for the feed gears 17 and 18 to advance rotationally relative to the drive gear 19 and thus cause the cam surfaces 57 and 58 and the roller cam surfaces 59, upon each revolution of the cutter head being described, to respectively gradually move the cutter blade 37 and the rollers 52 toward the tube 14 until the tube is completely severed.

FIG. 1 also shows the conventional electric switch 81 movably mounted on the housing half 10 and of course electrically connected to the motors 26 and 77. Activating the switch 81 to one side 82 will cause the cutting action described, and activating the switch to the other side designated 83 will reverse the motors 26 and 77 and cause the cutter blade 37 and rollers 52 to be moved radially outwardly before opening the tool and thereby setting it ready for the next tube to be received. In the reverse arrangement, the conventional wiring is that the motor 26 will rotate in the reverse direction and the motor 77 will turn off. That causes the feed gears 17 and 18 to rotate in the counterclockwise direction to thereby retract the cutting wheel 37 and the rollers 52. After a maximum opening has been achieved in that manner, rotation of the feed gears 17 and 18 will cause the drive gear 19 to rotate counterclockwise moving the worm gear 74 axially to actuate the nearby switch 78 which turns on the motor 77 in the opposite direction as that of motor 26. In that way the radial cut-outs can be aligned with each other and ready for the next cutting action.

Throughout this process, FIG. 11 shows the range of diameters of tubes to be cut, from the smallest tube 84 to the larger diameter tube 86, and, in all instances therein and therebetween, the cutter and the rollers will automatically center with the tube longitudinal axis.

Figure 3:
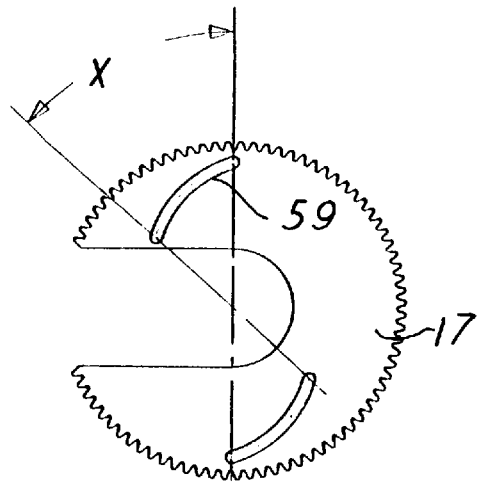
FIGS. 3 and 4 are top views of two gears of the invention.

FIG. 3 shows an angle designated "X" which shows the maximum amount of relative rotation between the feed and drive gears. Also, it displays the amount of radial movement for the cutter blade 37 and the rollers 52.

FIG. 9 shows another embodiment of the invention, and it also shows the application of a cordless screwdriver 87 in suitable and conventional driving relation with the gear set previously described. The two motors are eliminated and a suitable gear drive connects directly from the screwdriver output shaft 85 for, in this instance, counter clockwise rotation of the main drive gear 29. A reshaped housing 88 has a cavity 90 which receives a cordless screwdriver 87 with its shaft 85 being in drive relationship with bevel gears 95 and 89 rotationally mounted in the housing and in gear-drive relationship with drive gear 29. FIGS. 9–15 show this arrangement which uses a brake on feed gears 64 and 66.

FIGS. 9 through 15 show the brake arrangement. Here again the arrangement is for controlling the relative angular movement between the drive and the feed gear lines. The motor 26 is thus eliminated, and only the motor 77 is required and it drives the drive gear 29 counter clockwise. A friction brake, generally designated 91, is applied to the feed line to thus achieve the relative rotation between the drive and the feed, as previously mentioned. The brake 91 is arranged with the new housing 88 to project through the shown opening 127 in the housing 88 and to be centrally mounted on the upper end of the dowel or pin 69. The brake 91 includes a sleeve 92 which is axially movable on the pin 69 and is non-rotatable by means of a pin 124 through sleeve 92 and slidable in a slot 126 in pin 69. There is a rotatable control knob 93 threaded onto the sleeve 92 at 94. An annular piece 96 is piloted on the knob 93 and is retained axially thereof by means of a snap ring 97. The piece 96 is arranged to sit on the housing 88, which is fragmentarily shown in FIG. 14, and it is screwed thereto by means of the screws 98. Another annular piece 99 is centered with sleeve 92 and is axially movably attached to the stationary annular piece 96 by means of screws 101 which are in elongated slots 100 in the piece 96 for the up and down movement of the screws 101 and the piece 99, as seen in FIG. 14. The piece 99 presents a circular pocket 102 which receives two Belleville spring washers 103 which urge the piece 99 downwardly and away from an annular shoulder 104 on the sleeve 92.

Rotation of the knob 93 causes up and down movement of the sleeve 92 and thus causes compression of the Belleville springs 103 to a desired compression. That adjustment action forces a friction pad 106 affixed on the lower surface of piece 99 downwardly onto the upper surface 110 of the gear 64 seen in FIG. 10. In that arrangement, the retardation or drag force on the feed gears 64 and 66 is accomplished, as desired. With that selective arrangement, with each revolution the depth of cut on the tube can be controlled and only one motor is required, as seen in FIG. 10.

The amount of spring force supplied by the brake 91 determines the brake torque for the feed gear train or set to thereby cause it to angularly lag the drive gear train or set thus forcing the cutting wheel and support rollers to move toward the tube 14, all in the same manner previously explained.

FIGS. 16, 17, and 18 show another arrangement for supporting and presenting the cutter wheel 37 and the two rollers 52, and that arrangement is to employ a pivot arm 107 for the cutter 37 and a pivot arm 108 for the rollers 52. The arms 107 and 108 are pivotally supported on pivot pins 109 and 111, respectively. There are two spur gear segments 112 and 113 which form a gear cavity 114 for receiving the pivot arms and the like, as seen in FIG. 16. Each pivot arm 107 and 108 has a control pin 116 extending therefrom and extending to the exterior of the assembled gears 112 and 113, as seen in FIG. 17, and those two gear segments present an assembled gear 117. The projecting ends of the pins 116 extend through angulated slots 118 and 119 on both sides of the gear 117, and they project into the arcuate cam slots 57, 58 and the two slots 59, as previously described.

The cutter 37 is of course rotatably mounted on a pin 121 supported on the cutter arm 107. The rollers 52 are rotatably supported on a roller carrier 122 which is pivotally connected to the arm 108 by means of a pivot pin 123 and thus the rollers 52 are self-adjusting to apply equal pressure on the tube 14.

It will thus be seen and understood that the embodiment in FIGS. 16, 17 and 18, operates in the manner of the previously described embodiment, but the mounting and radial movement of the cutter blade and the rollers are different from the previously embodiment, and leverage is achieved.

Figure 20:
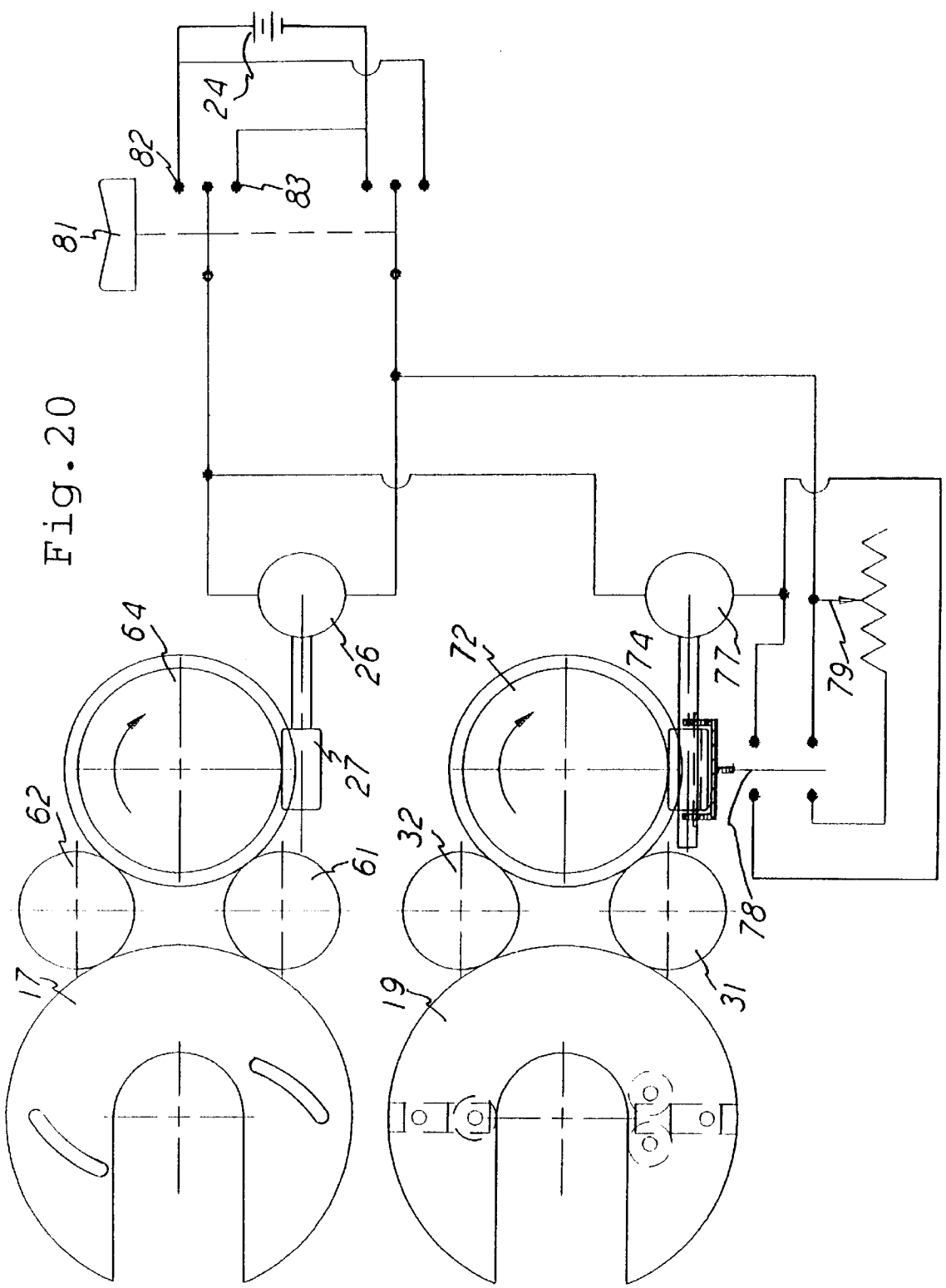
FIG. 20 is a diagrammatic view of parts and wiring herein.

FIG. 20 shows the electrical diagram with some of the aforementioned elements and showing one way of arranging the wiring. Thus the two-way action of the switch 81 displays the tube cutting connection 82 and the alternate connection 83 for opening the cutter for the next cutting action. Thus the motors 26 and 77 are driven in either selective direction of rotation. Also, the feed gear 17 and the drive gear 19 are shown in their respective lines of inducement of rotation, as mentioned above. The trip switch 78 is shown connected with the worm 74 and the motor 77 for its action upon rotation of the worm wheel 72 and the worm 74, as mentioned. Also, the speed switch 79 for the motor 77 is shown.

Both the cutting blade 37 and the rollers 52, which are shown capable of being interchanged in FIG. 20 are controlled by the drive gear 19 or 117 and the feed gears 17 and 18 with the four cam grooves with the two pins 39 and 56, or pins 116, slidably positioned radially thereby. In FIGS. 16 through 18, the control is by the pins 116 projecting through the two grooves 118 and 119 which are in each segment 112 and 113, and pins 116 extend into the four arcuate cam grooves previously described.

When the drive gear 19 or 117 initiates rotation in the counterclockwise direction, the feed gears are retarded and then the four grooves and the two pins again properly position the cutting blade 37 and the rollers 52 radially inwardly.

FIGS. 21 through 27 show a fifth embodiment of the invention, and all embodiments create the relative rotation between the feed gear and the drive gear, all to advance the cutting blade 37 and the rollers 52 relative to the axis "A".

The lower housing 11 is shown with its socket 131 for receiving the lower end of the pin 69 for, in this embodiment, both rotational and axial movement relative to the housing 11. In this embodiment, the pin 69 has a cross pin with its two opposite ends 132 and 133 extending therethrough and also extending through a sleeve 134 which is rotatable on the pin 69 but is axially fixed by and relative to the housing halves 10 and 11, such as by having a lower shoulder 136 resting on an annular surface 137 of the housing 11, and likewise, but unshown, for the sleeve shoulder 138 with the top housing 11. The pin ends 132 and 133 extend through the sleeve 134 by extending into two cam slots 139 disposed on diametrically sides of the sleeve 134, such as with the shown slot 139 in FIG. 25.

Figure 7:
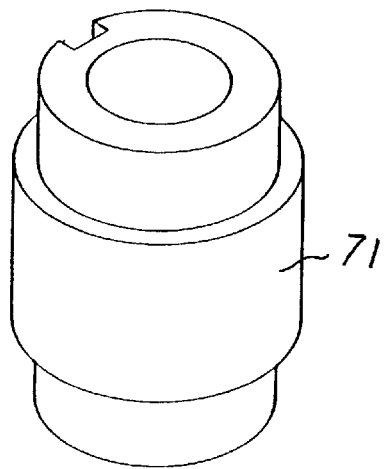
FIG. 7 is a top perspective view of a part in FIG. 1.
Figure 8:
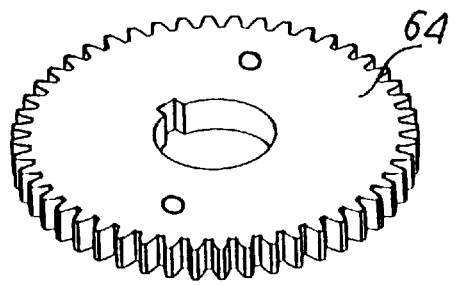
FIG. 8 is a perspective view of a gear of FIG. 1.

The two feed gears 64 and 66 are still keyed to the sleeve 134 through keyways 141 and 142 in the gears, and keyway 143 in the sleeve 134, just as shown in FIGS. 7 and 8. So the sleeves 71 and 134 always rotate with the gears 64 and 66. The new drive gear 144 has diametrically opposite grooves 146 and 147 which respectively receive the pin ends 132 and 133.

With that total rotation relationship, rotation of the drive gear 144, such as by a motor as previously explained, causes the FIG. 25 assembly, along with the feed gears 64 and 66, to rotate clockwise, by example.

Next, when there is downward axial movement of the pin 69, the cross pin ends 132 and 133 will slide down their respective sleeve cam slots 139 which are angled relative to the longitudinal axis of the pin 69 and are at about forty-five degrees of angulation. That camming action will induce rotation of the sleeve 134 relative to the pin 69. Then, through the key connections mentioned, the sleeve 134 will rotate the feed gears 64 and 66 to advance the cutting blade 37 and the rollers 52, as desired for the cutting action of the tube 14.

To achieve that relative rotation in the fifth embodiment being described, there is a manual control 151 mounted on the housing half 10, just as the brake 91 was mounted, and, of course, is in place of the brake 91. That mounting is through the screw holes 152 in a control body 153 which sits on top of the housing 10 in axial alignment with the axis of the pin 69.

FIGS. 26 and 27 show that the control 151 has a rotatable knob 154 thereon which is held by the snap ring 156 engaged with the secured body 153. A sleeve 157 is threaded to the knob at 158, and the sleeve has a flange 159 secured by slide pins 161 to the stationary body 153. The sleeve 157 moves axially up and down relative to the knob 154 upon rotation of the knob 154, and by virtue of the pins 161 sliding in the body 153. Finally, with the upper end of the pin 69 in the tubular opening 162 in the sleeve 157, the pin 69 is moved axially up and down in response to the rotation of the knob 154. In that manner, retardation of the rotation of the feed gears 64 and 66 is achieved. There may be suitable rotation bearings between all rotating parts, in any conventional manner.

Rotation of the knob 154 throughout the cutting action will create a gradual advance of the cutting blade 37 into the tube 14, all for smooth and continuous penetration of the tube 14 by the cutting blade 37 and without a ratcheting or notching action of a step-upon-step process of the prior art.

What is claimed is:

1. A tube cutter comprising a housing, a gear set disposed in said housing and including a plurality of gears rotatably supported on said housing, a tube cutting blade mounted on a first one of said gears in an arrangement to be rotatable along with the rotation of said first gear and to be movable radially relative to the rotation axis of said first gear and thereby be positioned into contact with a tube which is to be cut by said blade, a second one of said gears rotatably disposed on the rotation axis of said first gear and being disposed adjacent said first gear and being rotatable relative to said first gear, an interconnection arranged between said first and said second gears and said cutting blade whereby relative rotation between said first and said second gears radially positions said cutting blade in its tube cutting action, and a rotation drive control operative on said first and said second gears for controlling rotation thereof, including both the rotation about said axis and the relative rotation between said first and said second gears.

2. The tube cutter as claimed in claim 1, including two rollers radially movably mounted on said first gear, in positions opposed to the location of said cutting blade relative to the tube which is to be cut, and to be rotatable along with the rotation of said first gear and to be movable radially relative to the rotation axis of said first gear and thereby be positioned into contact with the tube which is to be cut by said cutting blade, and an additional interconnection arranged between said first and said second gears and said rollers whereby the relative rotation between said first and said second gears radially positions said rollers in contact with the tube which is to be cut by said cutting blade.

3. The tube cutter as claimed in claim 2, wherein said interconnections are arranged to respectively induce the same amount of radial movement of said cutting blade and said rollers in response to said relative rotation between said first and said second gears.

4. The tube cutter as claimed in claim 3, wherein said rotation drive control includes two driving power sources with each thereof in respective driving connection with said first and said second gears.

5. The tube cutter as claimed in claim 4, wherein said driving power sources connected with said first and said second gears are rotatable power sources which rotate at different speeds to produce the relative rotation between said first and said second gears.

6. The tube cutter as claimed in claim 1, wherein said interconnection between said first and said second gears and said cutting blade includes a cam-type interconnection which is arranged to be in constant operation during each rotation of said cutting blade about said axis.

7. The tube cutter as claimed in claim 6, wherein said cam-type interconnection includes a groove and a pin which are in sliding relation between said first and said second gears.

8. The tube cutter as claimed in claim 7, wherein there are two said grooves, each of which receives said pin, and with one of said grooves being on said first gear and radially disposed relative to said rotation axis, and with the other of said grooves being on said second gear and obliquely disposed relative to said rotation axis.

9. The tube cutter as claimed in claim 1, wherein said rotation drive control includes both a rotation driver connected to said first gear and a rotation brake operatively connected to said second gear, all for inducing the relative rotation between said first and said second gears.

10. The tube cutter as claimed in claim 9, including a manually controlled adjustment on said brake for establishing the radial position of said cutting blade and thereby establish the depth of cut in each rotation of said cutting blade around said axis.

11. The tube cutter as claimed in claim 1, wherein said rotation drive control includes a discrete powered tool selectively drivingly connected to said first and said second gears.

12. A tube cutter comprising a housing, a gear set disposed in said housing and including a plurality of gears rotatably supported on said housing, a tube cutting blade mounted on a first one of said gears in an arrangement to be rotatable along with the rotation of said first gear and to be movable radially relative to the rotation axis of said first gear and thereby be positioned into contact with a tube which is to be cut by said cutting blade, a second one of said gears rotatably disposed on the rotation axis of said first gear and being disposed adjacent said first gear and being rotatable relative to said first gear, a rotation drive operative on said first and said second gears for rotation thereof, and said rotation drive including a cam operatively interposed between said first and said second gears and said cutting blade and with said cam being arranged to transmit rotation between said first and said second gears and being arranged to permit relative rotation between said first and said second gears and to radially position said cutting blade in its tube cutting action.

13. The tube cutter as claimed in claim 12, wherein said cam is operative in response to rotation and is arranged to transmit rotation in clockwise and counter clockwise directions relative to said rotation axis in an arrangement to transmit rotation for advancing said cutting blade toward the tube in the clockwise rotation and for retracting said cutting blade from said tube in the counter clockwise rotation.

14. The tube cutter as claimed in claim 12, wherein said cam includes two cam slots with one thereof respectively in each of said first and said second gears and a pin carrying said cutting blade and with said pin being disposed in said two slots.

15. The tube cutter as claimed in claim 12, including rollers mounted on said first gear in an arrangement to be rotatable along with the rotation of said first gear and to be movable radially relative to the rotation axis of said first gear and thereby be positioned into contact with the tube, and an additional cam operatively interposed between said first and said second gears and said rollers and with said additional cam being arranged to radially position said rollers relative to the tube.

16. The tube cutter as claimed in claim 12, including a brake in operative braking relation with said second gear for retarding rotation of said second gear relative to said first gear and thereby induce the relative rotation between said first and said second gears for effecting the camming action mentioned.

17. The tube cutter as claimed in claim 12, wherein said rotation drive includes a rotatably mounted sleeve having a longitudinal axis, a support pin extending through said sleeve and along said axis and being rotatable and axially movable relative to said sleeve, said sleeve having a cam slot therethrough on each diametrically side thereof and thereby provide said cam, and a cross pin extending through said support pin and into each of said cam slots and being slidable in said slots upon axial movement of said support pin and thereby being arranged to induce the relative rotation of said first and said second gears.

18. The tube cutter as claimed in claim 17, including a control member supported on said housing and being operatively associated with said support pin for inducing the axial movement of said support pin.

19. The tube cutter as claimed in claim 18, wherein said control member is a knob threadly rotatably supported on said housing and arranged for incremental movement toward and away from said support pin along said axis.

20. A tube cutter for cutting a tube disposed within said cutter comprising a housing, two gears supported in said housing on a common axis and being rotatable on said axis and being rotatable relative to each other, rotation controls operatively and respectively connected with each of said gears for inducing rotation of said gears different from each other, a tube cutting blade supported on one of said gears for revolving around said axis upon rotation of said gears and being movable toward and away from said axis for movement relative to a tube which may extend along said axis, and a cam consisting of a pin slidable in a cam slot and being interengaged between said gears and said cutting blade and with said slot extending in a first direction to permit the relative rotation between said gears and extending in a second direction to permit movement of said cutting blade toward and away from said axis.

21. The tube cutter for cutting a tube disposed within the cutter, as claimed in claim 20, including a rotatably mounted sleeve in said housing and having a longitudinal axis disposed parallel to said gear axis, said sleeve being in rotation drive relation with one of said gears and having therein a cam slot on each diametrically opposite side of said sleeve and with said sleeve cam slots extending angled to said axis of said sleeve and being in addition to the first-mentioned said cam slot, a sleeve pin extending through said sleeve and along said sleeve axis and being rotatable and axially movable relative to said sleeve, and a cross pin extending through said sleeve pin and into each of said sleeve cam slots and being slidable in said sleeve cam slots upon axial movement of said sleeve pin and being in rotation drive with one of said gears and thereby being arranged to induce the relative rotation of said gears.

22. The tube cutter for cutting a tube disposed within the cutter, as claimed in claim 21, including a control member supported on said housing and being operatively associated with said sleeve pin for inducing the axial movement of said sleeve pin.

23. The tube cutter for cutting a tube disposed within the cutter, as claimed in claim 22, wherein said control member is a knob movably supported on said housing and arranged for complete gradual and uninterrupted movement toward and away from said sleeve pin along said sleeve axis.

* * * * *